United States Patent [19]

Baduel

[11] Patent Number: 5,733,617
[45] Date of Patent: Mar. 31, 1998

[54] PACKAGING MADE OF COMPOSITE PLASTIC EXHIBITING A SOFT FEEL EFFECT

[75] Inventor: Jean-Louis Baduel, Lamorlaye, France

[73] Assignee: L'Oreal, Paris, France

[21] Appl. No.: 400,885

[22] Filed: Mar. 8, 1995

[30] Foreign Application Priority Data

Mar. 21, 1994 [FR] France ................... 94 03264

[51] Int. Cl.⁶ ................................. B29D 23/20
[52] U.S. Cl. ............... 428/36.8; 428/35.2; 428/35.7; 428/36.91; 428/141; 428/213; 428/339; 428/515; 428/516
[58] Field of Search ................... 428/515, 516, 428/35.2, 36.8, 36.91, 213, 339, 141, 35.7

[56] References Cited

U.S. PATENT DOCUMENTS

| | | | |
|---|---|---|---|
| H1274 | 1/1994 | Hwo | 428/214 |
| 4,292,355 | 9/1981 | Bonis | 428/35 |
| 4,891,253 | 1/1990 | Mueller | 428/35.2 |
| 4,929,479 | 5/1990 | Shishido et al. | 428/35.2 |
| 5,128,212 | 7/1992 | Kneale et al. | 428/516 |

FOREIGN PATENT DOCUMENTS

| | | |
|---|---|---|
| 541876 | 10/1982 | Australia. |
| 0216639 | 4/1987 | European Pat. Off.. |
| 0371440A3 | 6/1990 | European Pat. Off.. |
| 0444671A2 | 9/1991 | European Pat. Off.. |
| J01103442A | 4/1989 | Japan. |
| 2139634 | 11/1984 | United Kingdom. |

OTHER PUBLICATIONS

English translation of J 011 03442A cited in Jan. 19, 1996 Office Action.
French Search Report Dated Nov. 21, 1994 for French Application No. 9403246.
JP 4119822 Abstract Apr. 21, 1992.
JP 63022828 Abstract Mar. 15, 1988.

*Primary Examiner*—Fred Teskin
*Attorney, Agent, or Firm*—Staas & Halsey

[57] ABSTRACT

Packaging wall made of a composite plastic of polymer layers, including: 1) an outer layer of a thermoplastic elastomer chosen from: copolymers of propylene and ethylene which have a Shore D hardness, measured according to ISO standard 868, which is lower than or equal to 40, mixtures of polypropylene homopolymer and of a terpolymer (ethylene, propylene, diene), polyethylene terephthalate elastomers, polyurethane elastomers, copolymers of ethylene and vinyl acetate, and block polyether-polyamides; and 2) an inner layer of a polyolefin which does not have elastomer characteristics and which is impervious to oxygen. The polymers of the layers have a molecular weight such that they can be formed by coextrusion-blow molding.

17 Claims, No Drawings

PACKAGING MADE OF COMPOSITE PLASTIC EXHIBITING A SOFT FEEL EFFECT

BACKGROUND OF THE INVENTION

1. Field of the Invention

The present invention relates to a packaging made of composite plastic exhibiting a soft feel effect.

2. Description of the Related Art

At the present time, most packaging —tubes or bottles employed especially in cosmetics —is made of plastic. Polyvinyl chlorides have practically ceased to be employed as plastic for manufacturing packaging because they are considered to be liable to pollute the environment. Polyolefins, which are recyclable and which are nonpolluting, are therefore generally employed. The polyolefins employed are, conventionally, low-density polyethylene, more particularly for the manufacture of tubes, and high-density polyethylene or polypropylene homopolymer, more particularly for the manufacture of bottles. These polyolefins have good properties of imperviousness to gases and to water vapor and have the advantage of being compatible with most chemical products. In general, polyolefin packaging is prepared by extrusion, more particularly by extrusion blow molding. However, the polyolefin packaging obtained has a disadvantage which is particularly awkward in cosmetics: it has a feel which is not very pleasant; in fact, it exhibits a slightly greasy and a slightly sticky feel, similar to that of a wax or of a paraffin wax, and a granular appearance or a certain roughness and, consequently, a high friction coefficient.

To overcome this disadvantage it has already been proposed to employ only propylene and ethylene elastomer copolymers, in particular the propylene and ethylene copolymer marketed under the name "Adflex" by the Himont company. These propylene and ethylene elastomer copolymers make it possible to obtain, by extrusion blow molding, tubes and bottles exhibiting a very soft and very pleasant feel; but these copolymers have an oxygen permeability which is two to three times higher than that of the polyethylenes and polypropylenes generally employed for the manufacture of tubes and bottles. Products packaged in tubes and bottles made of propylene and ethylene elastomer copolymers are therefore liable to be degraded by oxidation during storage. In addition, these propylene and ethylene elastomer copolymers have a poor parison behavior when being formed by extrusion.

Furthermore, it is known to prepare packaging from composite plastic materials of at least two layers of different plastics. It is known, for example, from U.S. Pat. No. 4,292,355 to prepare a container by thermo-forming a sheet of composite material obtained by coextrusion; the sheet of composite material includes at least one layer of polypropylene and an outer layer of an elastomer, namely a butadiene-styrene copolymer. However, the outer layer of butadiene and styrene copolymer does not impart a pleasant feel to the container because of its high friction coefficient.

SUMMARY OF THE INVENTION

According to the present invention it has been found that it is possible to prepare, especially by coextrusion-blow molding, packaging whose air permeability and feel are simultaneously satisfactory. This packaging includes a composite material of at least two layers which are simultaneously and easily coextrudable at elevated temperature. This composite material includes an outer layer of a thermoplastic elastomer chosen from a specific first group and an inner layer of a polyolefin which does not have the characteristics of an elastomer and which is impervious to oxygen.

The choice of the pair of constituents forming the composite material is such that it provides a material in which the different layers have a good parison behavior and good adhesiveness to each other. The parison, it should be remembered, is the unit quantity of material which leaves the extruder in order to be moulded.

The constituent of the outer layer is softer and more flexible than that of the inner layer which is leakproof to oxygen and imparts a certain behavior to the packaging, given that it forms its backbone. In fact, the constituent of the inner layer can guarantee the mechanical strength of the packaging in order to avoid its accidental bursting when subjected to an excessive mechanical pressure and/or an increase in temperature.

The packaging thus formed can satisfy industrial manufacture, storage and use constraints. It can also be elastically deformable and thus recover its initial form after a pressure has been applied to it.

DESCRIPTION OF THE PREFERRED EMBODIMENTS

The subject of the present invention is therefore a packaging whose wall includes a composite plastic made up of at least two polymer layers, as follows:

1) an outer layer of a thermoplastic elastomer chosen from the group made up of:

random and block copolymers of propylene and ethylene which have a Shore D hardness, measured according to ISO standard 868, which is lower than or equal to 40, mixtures of polypropylene homopolymer and of a terpolymer (ethylene, propylene, diene), polyethylene terephthalate elastomers, polyurethane elastomers, copolymers of ethylene and vinyl acetate and block polyether-polyamides;

2) an inner layer of a polyolefin which does not have the characteristics of an elastomer and which is impervious to oxygen;

3) the polymers of the layers of the composite plastic have a molecular weight such that they can be formed by coextrusion-blow molding.

The polyolefin of the inner layer of the wall is preferably chosen from the group made up of:

high- or low-density polyethylenes, polypropylene homopolymers, random and block copolymers of propylene and ethylene which have a Shore D hardness, measured according to ISO standard 868, higher than 40.

An elastomer is a plastomer which exhibits three specific characteristics. Firstly, its rigidity modulus must be low at ambient temperature, secondly it must withstand considerable deformations without breaking and, finally, it is resilient, that is to say that it recovers its initial geometry after having been subjected to a stress.

The copolymers of propylene and ethylene forming the outer layer of the composite plastic preferably have a flexural modulus, according to ISO standard 178, lower than or equal to 650 MPa, and the copolymers of propylene and ethylene forming the inner layer preferably have a flexural modulus, according to ISO standard 178, higher than 650 MPa.

When the outer layer includes an elastomer other than a copolymer of propylene and ethylene, the elastomer advantageously has a Shore D hardness, measured according to ISO standard 868, lower than or equal to 40 and, when the inner layer includes a polyolefin other than a copolymer of propylene and ethylene, the polyolefin has a Shore D hardness higher than 40.

Among the thermoplastic elastomers usable according to the invention it is possible to mention the copolymer of propylene and ethylene marketed under the name "Adflex" by the Himont company and the mixtures of polypropylene homopolymer and of a terpolymer (ethylene, propylene, diene) which are marketed under the names "Vistaflex" and "Santoprene" by the A.E.S. company.

Low- and high-density polyethylene has been mentioned among the nonelastomer polyolefins usable for forming the inner layer of the composite plastic: low-density polyethylene is an ethylene polymer which has a random polymeric development and high-density polyethylene is an ethylene polymer which has an oriented polymerization, the main chain having numerous short branches.

The packaging according to the invention has the advantage that the outer elastomer layer contributes a pleasant feel and the inner polyolefin layer provides imperviousness to oxygen. In addition, most of the elastomers forming the outer layer are relatively soft and flexible and would not make it possible, on their own, to manufacture a packaging which has good mechanical strength; the polyolefin of the inner layer makes it possible to guarantee good mechanical strength of the packaging and, consequently, to avoid accidental bursting of the packaging when excessively high mechanical pressures are applied to it and/or when the temperature increases. The composite material remains elastically deformable and can consequently recover its initial shape after deformation. Furthermore, as explained below, the elastomers of the outer layer according to the invention and the polyolefins of the inner layer according to the invention have good parison behavior and are easily coextrudable at elevated temperature, giving layers that have good adhesiveness to each other. The packaging according to the invention can therefore withstand the stresses of industrial manufacture and of storage as well as the stresses of use.

The wall can be formed by coextrusion-blow molding. The mold is preferably chosen so that the outer surface of the composite plastic, when it has a Shore D hardness lower than 40, has a roughness such that the average Ra of the variations in roughness is between 0.2 μm and 1.5 μm, preferably between 0.4 μm and 1.5 μm, and the number Pc of peaks per cm is higher than 50.

The two parameters Ra and Pc are, in fact, the roughness parameters allowing the surface quality of the outer layer to be defined. These parameters depend both on the nature of the elastomer forming the outer layer and on the surface quality of the mold employed for the blow-molding. The first parameter Ra is the arithmetic mean of the variations, in the actual surface in relation to the median surface; this arithmetic mean Ra is given by the formula $$Ra = \frac{1}{lm} \int_o^{lm} |f(x)| dx$$

in which f(x) is the measurement of the distance from the actual surface to the median surface at an abscissa point x over a length 1m, measured with the aid of a "Surftest 301" apparatus marketed by the Mitutoyo company.

The second parameter Pc is the number of peaks per centimeter exceeding a band centered on the average surface of the actual surface and having a thickness of ±0.25 μm as ordinate. To measure this parameter it is also possible to employ the "Surftest 301" apparatus marketed by the Mitutoyo company.

The numerical values of the parameters Ra and Pc for elastomers which have a Shore D hardness lower than 40 have been determined from two two-dimensional graphs, the first representing the Shore D hardness as a function of the roughness Ra, and the second the number of peaks as a function of the roughness Ra. The two regions in which a very soft and satiny feel of the "baby's skin" type is obtained is determined on these graphs.

The composite material of the packaging according to the present invention advantageously has a permeability to oxygen lower than or equal to 5 000 $cm^3/m^2/24$ hours in the case of a wall of 25 μm thickness at 45° C. with a pressure difference of $10^5$ pascals. This oxygen permeability is comparable with that of the polypropylene homopolymers and polyethylenes generally employed for the manufacture of packaging which, under the same conditions of measurement, is 6 000 $cm^3/m^2/24$ hours for low-density polyethylene, 3 600 $cm^3/m^2/24$ hours for a polypropylene homopolymer and 2 800 $cm^3/m^2/24$ hours for high-density polyethylene. On the other hand, it is markedly lower than that of the ethylene and propylene elastomer copolymer marketed under the name "Adflex" by the Himont company which, under the same conditions of measurement, is 11 000 $cm^3/m^2/24$ hours.

According to the invention the polymer forming the inner layer and/or that forming the outer layer of the composite material may contain a filler, colored or otherwise, so as to color or opacify the composite material.

The wall thickness of the packaging according to the invention is advantageously between 750 and 1 450 μm; the walls of the packaging may have a uniform thickness or a variable thickness.

Preferably, according to the invention, the thickness of the thermoplastic elastomer outer layer represents between 10 and 30% of the total thickness of the composite material and the polyolefin nonelastomer inner layer is between 70 and 90% of the total thickness of the composite material.

The examples given below, purely by way of illustration and without any limitation being implied, will enable the invention to be better understood.

In these examples trapezoidal bottles 140 mm in height, which have a small base of 60 mm and a large base of 80 mm and are provided with a neck of 19 mm external diameter were manufactured; the neck is connected to the side wall of the bottle by an ogival shape. The manufacture was performed by a conventional coextrusion-blow moulding technique.

In order to perform the various measurements on the wall of these bottles, 1×1 cm samples were taken from the side wall of the bottle. The measurements were performed as described above.

EXAMPLE 1

A bottle whose side wall has a thickness of 1200 μm was prepared by coextrusion-blow molding of a composite material made up of an inner layer A and an outer layer B.

Layer A included a random copolymer of propylene and ethylene marketed under the name "Appryl 3020 GN 3" by the Appryl company; this polymer has a flexural modulus, measured according to ISO standard 178, higher than 650 MPa and a Shore D hardness, measured according to ISO standard 868, higher than 40. Layer A represents 76% by weight of the total composite material and has a thickness of 1050 μm.

Layer B included 19% by weight, relative to the total weight of the composite material, of an ethylene propylene elastomer copolymer sold under the name "Adflex" by the Himont company, which has a Shore D hardness of 36 and, as filler, of 5% by weight, relative to the total weight of the composite material, of pulverulent $TiO_2$. Layer B has a thickness of 150 μm.

The following parameters were measured:

permeability to oxygen (corrected to a thickness of 25 μm at 45° C. at a pressure difference of $10^5$ Pa): 3 500 $cm^3/m^2/24$ hours average Ra of the variations in roughness of the surface of layer B: 0.65 μm number Pc of peaks/cm on the surface of layer B: 80

The feel of this bottle is soft and pleasant.

EXAMPLE 2

The procedure was as in Example 1, with the difference that the surface quality of the mould employed in Example 1 was modified by a sanding technique.

A bottle which had the same characteristics as in Example 1 was obtained, except that the average Ra of the variations in roughness of the surface of layer B is 1.09 μm and the number Pc of peaks/cm of the surface of layer B is 54.

This bottle has a soft and pleasant feel.

EXAMPLE 3

A bottle whose wall has a thickness of 1 250 μm is prepared by coextrusion-blow molding using the same mold as in Example 1 of a composite material made up of an inner layer A1 and an outer layer B1.

Layer A1 included a polypropylene homopolymer sold under the trade name "3021 BN" by the Appryl company; it represents 80% by weight of the total composite material and has a thickness of 1 000 μm.

Layer B1 included a random elastomer copolymer of propylene and ethylene, sold under the trade name "Adflex" by the Himont company, which has a Shore D hardness of 36; it represents 20% by weight of the total composite material; the thickness of layer B1 is 250 μm.

The following parameters were measured:

permeability to oxygen (corrected to 25 μm thickness at 45° C. at a pressure difference of $10^5$ Pa): 2 235 $cm^3/m^2/24$ hours average Ra of the variations in roughness of the surface of layer B1: 1.71 μm.

number Pc of peaks/cm of the surface of layer B1: 55

This bottle has a soft and pleasant feel.

I claim:

1. Hollow, co-extrusion blow molded, relatively rigid packaging for containing a product and having a wall made of a composite plastic of polymer layers, comprising:
   1) an outer layer of the packaging for contacting a hand of a user and including a thermoplastic elastomer chosen from copolymers of propylene and ethylene which have a Shore D hardness, measured according to ISO standard 868, which is lower than or equal to 40; and
   2) a relatively harder inner layer of the packaging including a polyolefin which does not have the characteristics of an elastomer is impervious to oxygen, is for contacting the product in the packaging and is for imparting the relative rigidity to the packaging;
   wherein the polymer layers have a molecular weight to allow the composite plastic to be coextrusion-blow molded.

2. Packaging according to claim 1, wherein the copolymers of propylene and ethylene of the outer layer have a flexural modulus, measured according to ISO standard 178, lower than or equal to 650 MPa.

3. Packaging according to claim 1, wherein the outer surface of the composite plastic, when the Shore D hardness is lower than 40, has a roughness such that an average Ra of variations in roughness is between 0.2 μm and 1.5 μm and that a number Pc of peaks per cm is higher than 50.

4. Packaging according to claim 3, wherein an average Ra of the variations in roughness is between 0.4 μm and 1.5 μm.

5. Packaging according to claim 1, wherein the composite plastic has a permeability to oxygen lower than 5 000 $cm^3/m^2/24$ hours at 45° C. in the case of a sample of 25 μm thickness and at a pressure difference of $10^5$ pascals.

6. Packaging according to claim 1, wherein a thickness of the outer layer of the composite plastic represents 10 to 30% of a total thickness of the composite plastic.

7. Packaging according to claim 1, wherein a thickness of the inner layer of the composite plastic represents 70 to 90% of a total thickness of the composite plastic.

8. Packaging according to claim 1, wherein the polyolefin of the inner layer is chosen from high- or low-density polyethylenes.

9. Packaging according to claim 1, wherein the polyolefin of the inner layer is chosen from polypropylene homopolymers.

10. The packaging as recited in claim 1, wherein the packaging is one of a bottle and a tube.

11. Packaging having a wall made of a composite plastic of polymer layers, comprising:
    1) an outer layer of the packaging including a thermoplastic elastomer chosen from copolymers of propylene and ethylene which have a Shore D hardness, measured according to ISO standard 868, which is lower than or equal to 40; and
    2) an inner layer of the packaging including a polyolefin which does not have the characteristics of an elastomer and which is impervious to oxygen,
    wherein the polymer layers have a molecular weight such that the composite plastic can be formed by coextrusion-blow molding, and
    wherein the polyolefin of the inner layer is chosen from copolymers of propylene and ethylene which have a Shore D hardness, measured according to ISO standard 868, higher than 40.

12. Packaging according to claim 11, wherein the copolymers of propylene and ethylene of the inner layer have a flexural modulus, measured according to ISO standard 178, higher than 650 MPa.

13. Packaging according to claim 11, wherein the outer surface of the composite plastic, when the Shore D hardness is lower than 40, has a roughness such that an average Ra of variations in roughness is between 0.2 μm and 1.5 μm and that a number Pc of peaks per cm is higher than 50.

14. Packaging according to claim 13, wherein an average Ra of the variations in roughness is between 0.4 μm and 1.5 μm.

15. Packaging according to claim 11, wherein the composite plastic has a permeability to oxygen lower than 5 000

$cm^3/m^2/24$ hours at 45° C. in the case of a sample of 25 µm thickness and at a pressure difference of $10^5$ pascals.

16. Packaging according to claim 11, wherein a thickness of the outer layer of the composite plastic represents 10 to 30% of a total thickness of the composite plastic.

17. Packaging according to claim 11 wherein a thickness of the inner layer of the composite plastic represents 70 to 90% of a total thickness of the composite plastic.

* * * * *